Feb. 17, 1931.  M. D. FITZGERALD  1,793,425
CYLINDER HEAD GASKET
Filed Aug. 7, 1929
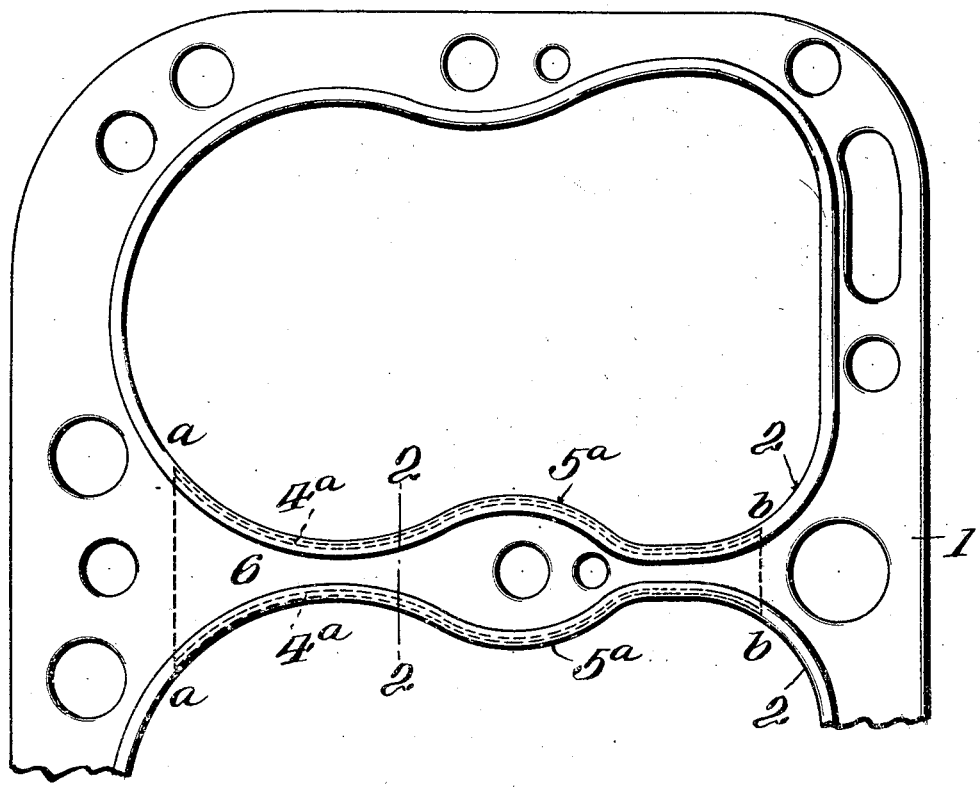
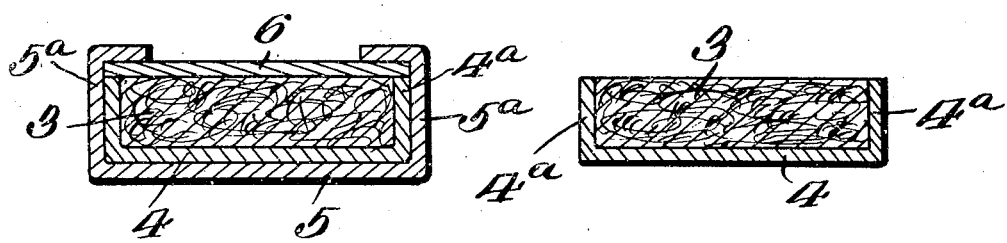
Inventor
Martin D. Fitzgerald
By Sturtevant & Mason
Attorneys Patented Feb. 17, 1931

1,793,425

UNITED STATES PATENT OFFICE

MARTIN D. FITZGERALD, OF TORRINGTON, CONNECTICUT, ASSIGNOR TO THE FITZGERALD MANUFACTURING COMPANY, OF TORRINGTON, CONNECTICUT, A CORPORATION OF CONNECTICUT

CYLINDER-HEAD GASKET

Application filed August 7, 1929. Serial No. 384,181.

The invention relates to new and useful improvements in a gasket for internal combustion engines and more particularly to a gasket adapted to be placed between the cylinder head and the cylinder block of a multiple cylinder engine.

An object of the invention is to provide a gasket for internal combustion engines wherein the portion of the gasket between adjacent cylinder openings is reinforced by a sheathing extending across one face of the gasket and across the edges, terminating at the upper face of the gasket.

In the drawings:—

Fig. 1 is a plan view showing a portion of a gasket embodying the improvements.

Fig. 2 is an enlarged sectional view on the line 2—2 of Fig. 1.

Fig. 3 is a sectional view through the sheet of packing showing the sheathing applied thereto and prior to the application of the metal covering plates to the gasket.

In my co-pending application Serial Number 384,179, filed of even date herewith, I have shown and described a gasket for a multiple cylinder engine consisting of a fibrous packing and pliable metal covering plates therefor, which also includes a reinforcing metal plate for strengthening that portion of the gasket in the region between adjacent cylinder openings.

The present invention has to do with an improved arrangement of the sheathing which reinforces this section of the gasket. The gasket includes an inner packing of asbestos or other suitable fibrous material, an upper covering plate and an under or lower covering plate. The sheathing plate is first applied to the sheet of packing in the region between the lines a—a and b—b of Fig. 1, and this sheathing extends all the way across the under face and is folded up through the cylinder openings. The sheathing terminates at the upper face of the sheet of packing. The upper covering plate is preferably of such width as to fit within the upturned edge portions of the sheathing and thus the covering plate and sheathing completely house the packing in the region stated. The under covering plate is folded up through the cylinder openings and back onto the outer face of the upper covering plate.

Referring more in detail to the drawings, the invention is shown as embodied in a gasket consisting of a body portion 1 having cylinder openings 2, 2. The gasket consists of a sheet of packing material 3 which may be of asbestos or any other suitable fibrous material. It includes also a sheathing 4 preferably made of copper, an under covering plate 5 and an upper covering plate 6, which cover plates are likewise preferably made of copper. The sheathing 4 extends from the line a—a to the line b—b in Fig. 1 and is for the purpose of reinforcing that portion of the gasket lying between the cylinder openings. The sheathing is first applied to the under face of the sheet of packing and is folded up through the cylinder openings. The plate is preferably of such width that the upturned portions are substantially of a height equal to the thickness of the sheet of packing. The covering plate 6 is preferably so dimensioned as to lie within the upturned edge portions.

In the drawings the upturned edge portions of the sheathing 4 are indicated at 4a. The covering plate 5 has its edge portions turned through the cylinder openings 2 as indicated at 5a, 5a and the upper portions are folded back onto the outer face of the covering plate 6.

From the above it will be noted that the sheet of packing in the region between the lines a—a and b—b is completely housed by the sheathing plate and covering plate and that the housed sheet of packing in this region is likewise housed within the under covering plate or substantially so. When the cylinder block is applied it will bear on the folded back portions of the under covering plate and will cause said folded back portions to firmly grip the upper covering plate. The upper covering plate makes contact with the sheet of packing and will be pressed into firm contact therewith. This provides a gasket joint which is very tight and wherein the high pressure of gases incident to the operation of the engine will neither be across the face of the gasket from one cylinder chamber to another nor through the fibrous packing of the gasket.

It is obvious that the manner of joining the edge portions of the covering plates may be varied without departing from the spirit of the invention as set forth in the appended claim.

Having fully described my invention what I claim as new and desire to secure by Letters Patent, is:—

A gasket for internal combustion engines or the like including a sheet of packing material having a plurality of cylinder openings within its limits which are closely spaced relative to each other, an inserted metal sheathing applied to one face of the sheet of packing between the cylinder openings and folded so as to extend across the edges of the packing at the openings and terminating at the other face of the packing, a plate of pliable metal on each face of the sheet of packing and covering the same, one of said plates engaging the face of the sheet between the upturned edge portions of the sheathing and the other of said plates being folded back so as to overlap the first-named plate along the edge of the cylinder openings and completely enclose said sheathing and packing in the region between the cylinder openings.

In testimony whereof, I affix my signature.

MARTIN D. FITZGERALD.